United States Patent [19]
Crosbie

[11] Patent Number: 6,165,423
[45] Date of Patent: Dec. 26, 2000

[54] OZONE GENERATOR

[76] Inventor: Robert Crosbie, 21010-123rd Avenue, Maple Ridge, British Columbia, Canada, V2X 4B4

[21] Appl. No.: 09/265,993

[22] Filed: Mar. 11, 1999

[30]  Foreign Application Priority Data

Mar. 18, 1998  [CA]  Canada ................................ 2226927

[51] Int. Cl.⁷ ...................................................... B01J 19/08
[52] U.S. Cl. ................................. 422/186.07; 422/186.12; 422/4
[58] Field of Search ..................... 422/186.07, 186.12, 422/4

[56]  References Cited

U.S. PATENT DOCUMENTS

| | | | |
|---|---|---|---|
| 2,658,868 | 11/1953 | Collison | 204/320 |
| 3,967,131 | 6/1976 | Slipiec et al. | 250/532 |
| 4,035,657 | 7/1977 | Carlson | 250/533 |
| 4,159,971 | 7/1979 | Gneupel | 250/540 |
| 5,087,428 | 2/1992 | Fletcher et al. | 422/186.07 |
| 5,124,132 | 6/1992 | Francis, Jr. et al. | 422/186.07 |
| 5,160,481 | 11/1992 | Weaver | 422/186.07 |
| 5,433,927 | 7/1995 | Mausgrover et al. | 422/186.07 |
| 5,437,843 | 8/1995 | Kuan | 422/186.07 |
| 5,752,878 | 5/1998 | Balkany | 422/186.07 |
| 5,820,028 | 10/1998 | Ferone | 422/124 |

*Primary Examiner*—Kishor Mayekar
*Attorney, Agent, or Firm*—Hall, Priddy, Myers & Vande Sande

[57]  ABSTRACT

An ozone generator of the corona discharge type having a housing which is dimensioned to fit into one of a male end and female end of an air duct of a building and a glass tube of a radius substantially less than a width of the housing. An electrically conductive inner mesh is fitted over an interior surface of the glass tube and an electrically conductive outer mesh is fitted over an exterior surface of the glass tube. The ozone generator also has means for generating a high electric potential difference across the electrically conductive meshes.

5 Claims, 3 Drawing Sheets

OZONE GENERATOR

FIELD

The invention is related to an ozone generator specifically an ozone generator that can be fitted into an air duct of a building.

BACKGROUND OF THE INVENTION

Ozone is a powerful oxidant readily oxidizing organic pollutants, inorganic pollutants and micro-organisms. As ozone reacts, it breaks down into oxygen thereby providing an environmentally friendly alternative to halogenated oxidants. Consequently, ozone is ideal for use in water and air treatment.

Although ozone generators have been used extensively to purify water in swimming pools and improve residential air quality, commercial establishments that expel harmful exhaust gases into the atmosphere or generate noxious odors have not taken advantage of the oxidizing properties of ozone to purify the exhaust air that they emit into the atmosphere. Part of the reason is that known ozone generators are incapable of being mounted directly onto an air exhaust outlet pipe or furnace flue of a building. Known ozone generators are also large and bulky and incapable of high capacity air treatment that is needed by such commercial establishments.

U.S. Pat. No. 5,160,481, issued to Weaver, discloses an ozone generation apparatus with a housing containing an ozone generator that fits into an opening cut into a panel of an air duct. A second housing containing the electric potential generation means is fastened to the panel. The housing has a pair of porous walls which allow air to flow through the housing to the metal grid plates which generate ozone. This device can be mounted in air handling systems but installation is time-consuming and requires a skilled technician. The device is also bulky since it has multiple housings.

U.S. Pat. No. 3,967,131, issued to Slipiec et al., discloses an ozone generative unit with multiple electrode and dielectric tube assemblies in electric contact surrounded by a cylindrical casing. Each assembly has three concentric dielectric tubes with decreasing axial lengths from the outermost to the innermost tube. There is a mesh electrode on the internal surface of each tube and a more rigid mesh electrode on the external surface of the tube. Aside from being bulky, Slipiec et al's device is not capable of being installed on an air outlet pipe.

The following patents disclose complex ozone generators incapable of being mounted onto an air outlet pipe and producing ozone on a commercial scale: U.S. Pat. No. 4,035,657, issued to Carlson, U.S. Pat. No. 5,437,843, issued to Kuan, U.S. Pat. No. 5,433,927, issued to Mausgrover, U.S. Pat. No. 4,159,971, issued to Gneupel, U.S. Pat. No. 2,658,868, issued to Collison.

U.S. Pat. No. 4,035,657, issued to Carlson, discloses a complex ozone generator having a series of cells that generate ozone which is then injected into a stream of water or discharged into a room.

U.S. Pat. No. 5,437,843, issued to Kuan, discloses an ozonizer having an ozone converter comprising of an insulating inner pipe, a conductive outer pipe, an air passage between the inner pipe and the outer pipe, and an electrode screen coupled to an electrode member within the inner pipe.

U.S. Pat. No. 5,433,927, issued to Mausgrover, discloses an ozone generator having an inner electrode with a mass of helical windings which may have milled sponges and an outer electrode separated by a dielectric tube. A second tube of dielectric material surrounding the ozone converter defines an air passageway.

U.S. Pat. No. 4,159,971, issued to Gneupel, discloses an ozone generator with a core, a helically shaped groove formed around the core to provide a passage for the air and the ozone that is formed, an inner electrode, an outer electrode, and a dielectric tube between the inner and outer electrodes, a cooling channel internal to the core, and an outer jacket surrounding the outer electrode having fins in an axial direction which radiate the heat produced. The core may serve as an inner electrode.

U.S. Pat. No. 2,658,868, issued to Collison, discloses an ozone generator which comprises a cylindrical gas chamber with a pair of end walls, a cylindrical inner chamber with a pair of end walls, a pair of electrodes positioned on either side of the inner chamber, an oxygen pipe connected to oxygen tanks to provide oxygen to the gas chamber, and an outlet pipe to remove the ozone generated by the electrodes.

Accordingly, the object of this invention is to provide for an ozone generator that can be easily installed onto the air outlet duct particularly of commercial establishments and is capable of treating air flowing through the outlet duct before it exits into the atmosphere.

SUMMARY OF THE INVENTION

According to the invention, there is provided an ozone generator of the corona discharge type having a cylindrical glass tube of a radius substantially less than a width of the housing. The cylindrical glass tube is normally open at both ends to permit air to flow essentially unimpeded through the device. The interior and exterior surfaces of the cylindrical glass tube are fitted with electrically conductive inner and outer meshes. The device is also furnished with a means for generating an electric potential difference across the interior and exterior surfaces of the cylindrical glass tube (i.e. between the electrically conductive inner and outer meshes). The electric potential difference is required to be sufficiently large to allow corona discharge. Finally, the device may have a housing which is dimensioned to fit into one of a male end and female end of an air duct of a building. The housing is at ground potential and is electrically isolated from the rest of the elements of the ozone generator. This feature provides ease and safety when attaching the device to an air duct.

Preferably, the housing is a hollow metal tube and the air duct is an air exhaust pipe.

Preferably, the radius of the cylindrical glass tube is such that the volume of air exposed to the surface of the electrically conductive inner mesh and the volume of air exposed to the surface of the electrically conductive outer mesh are substantially the same.

There is also provided an ozone generator of the corona discharge type having a housing dimensioned to fit into one of a male end and female end of an air duct of a building. Again, the housing is at ground potential and electrically isolated from the rest of the ozone generating device. The housing contains a plurality of ozone generating cells mounted in longitudinal alignment. Each cell has a cylindrical glass tube of a radius substantially less than a width of the housing. The cylindrical glass tube is normally open at both ends to permit essentially unimpeded air flow through the device. The interior and exterior surfaces of the cylindrical glass tube are fitted with electrically conductive inner and outer meshes. Finally, the device is equipped with a means for generating an electric potential difference across the interior and exterior surfaces of the cylindrical glass tube (i.e. between the electrically conductive inner and outer meshes). The electric potential difference is required to be sufficiently large to allow corona discharge.

BRIEF DESCRIPTION OF THE DRAWINGS

The novel features believed to characterize the invention are set forth in the appended claims. The invention, itself, however, as well as other features and advantages thereof, will be best understood by reference to the detailed description which follows, read in conjunction with the accompanying drawings, wherein:

DETAILED DESCRIPTION WITH REFERENCE TO THE DRAWINGS

Figure 1:
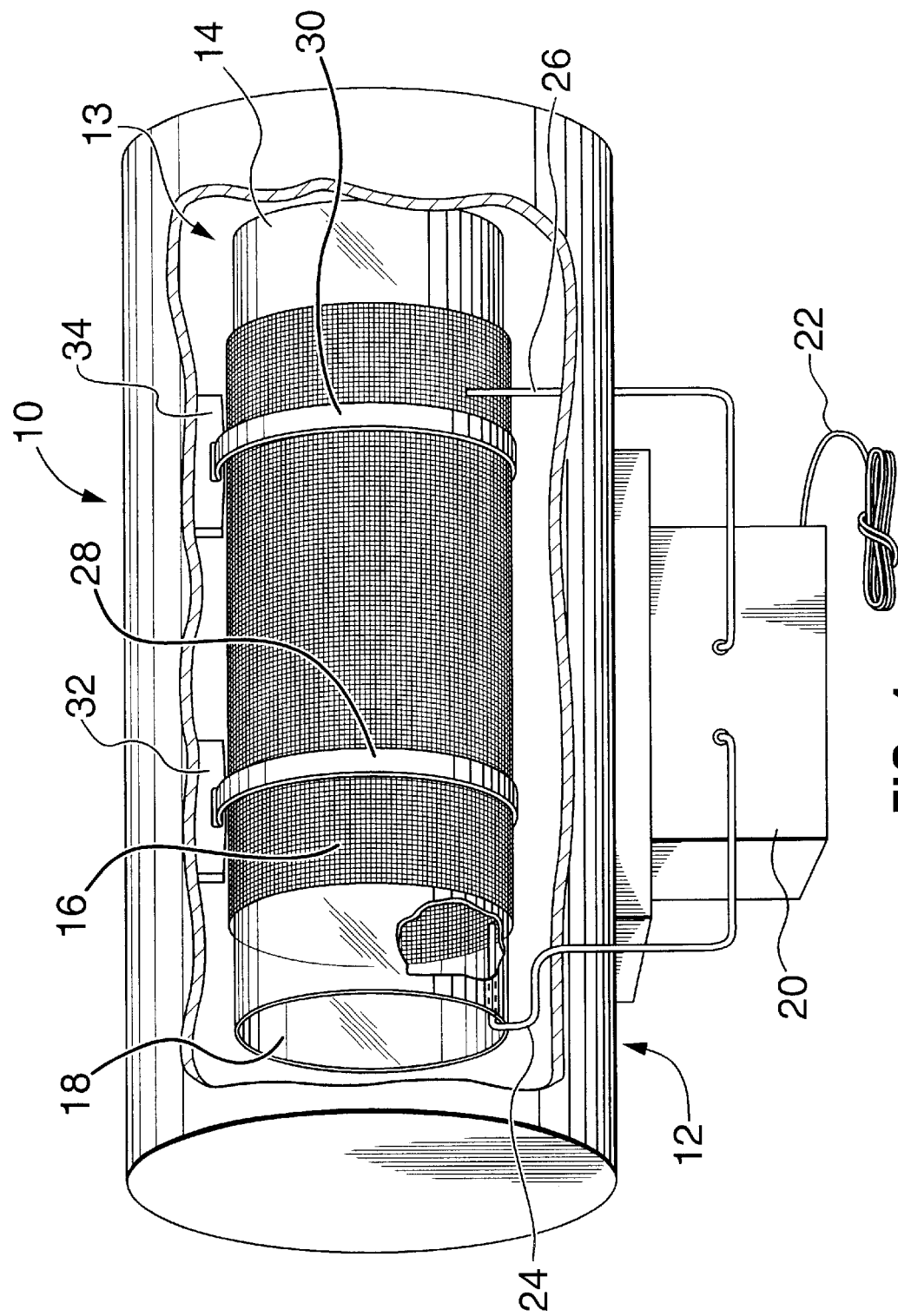
FIG. 1 is a perspective view of an ozone generator with a section of its outer covering cut away.
Figure 2:
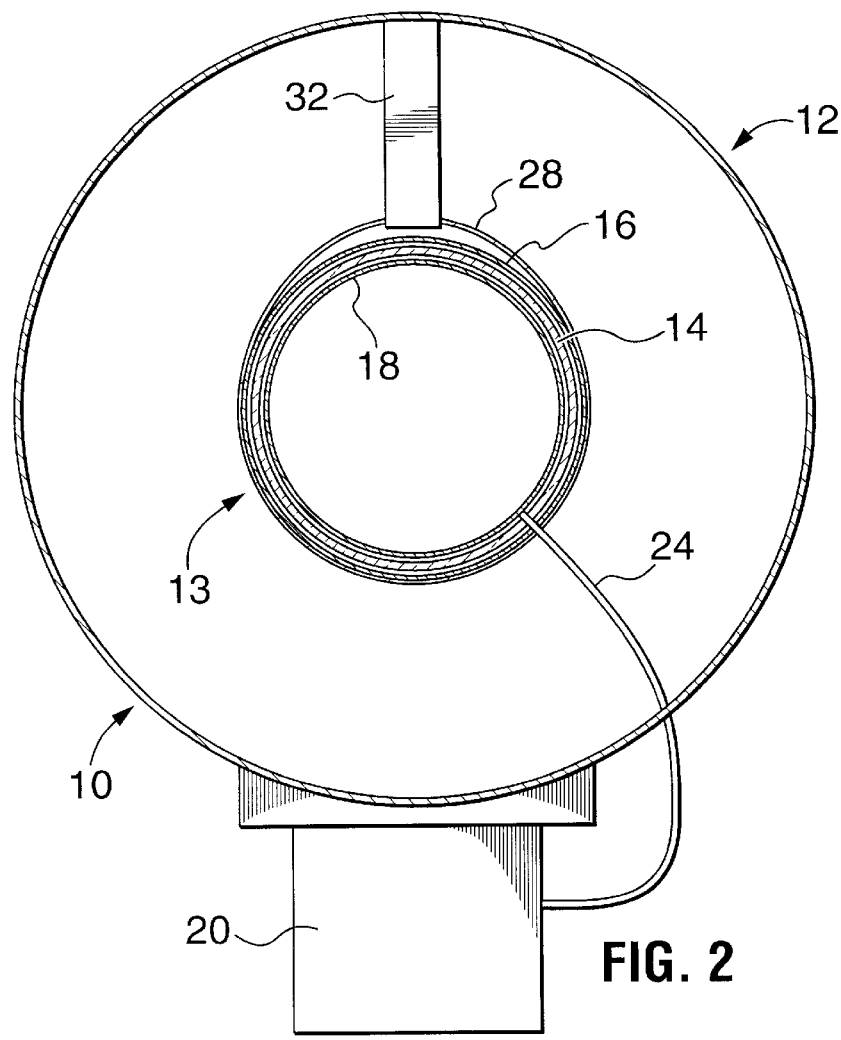
FIG. 2 is an end view of the ozone generator.

Referring to FIG. 1 and FIG. 2, an ozone generator 10 consists of an ozone generating cell 13 positioned inside a hollow cylindrical housing 12 constructed from stainless steel. Cell 13 consists of a glass tube 14 and electrically conducting stainless steel wire meshes 16, 18. Interior wire mesh 18 is disposed adjacent an interior surface of tube 14 and exterior wire mesh 16 is disposed adjacent an exterior surface of tube 14. Two stainless steel clamps 28, 30 coupled to nylon mounts 32, 34, respectively, encircle exterior wire mesh 16 holding cell 13 concentric within housing 12. Nylon mounts 32, 34 are securely affixed to housing 12 with fasteners.

Wire 24 connects interior wire mesh 18 and wire 26 connects exterior wire mesh 16 to transformer 20. Transformer 20 is mounted on an outside surface of housing 12 and is connected to a source of line voltage by wire 22. Transformer 20 produces a high output voltage which causes a high voltage differential between wire meshes 16, 18. A resulting corona discharge converts oxygen present to ozone.

Figure 3:
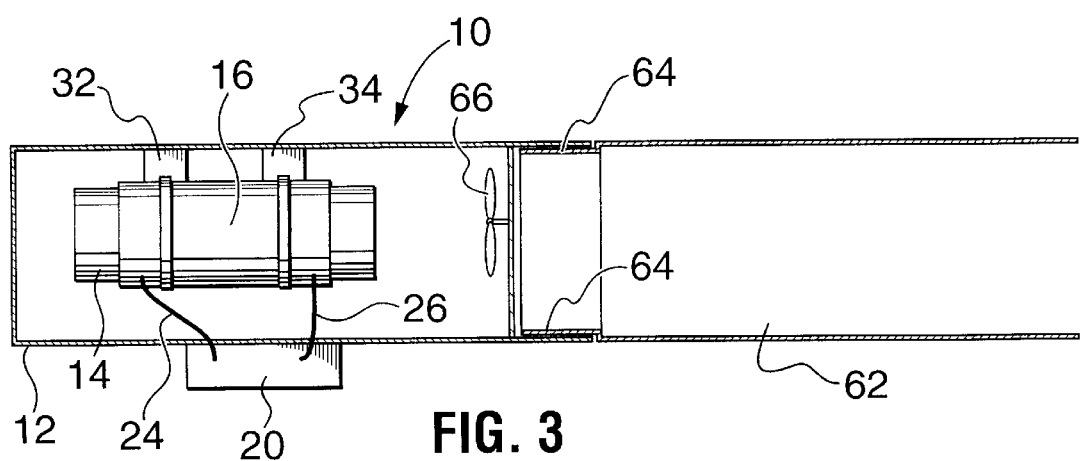
FIG. 3 is a sectional view of an ozone generator with a fan fitted over an air duct; and, FIG. 4 is a perspective view of an ozone generator with two ozone generating cells.

Referring to FIG. 3, housing 12 is of a sufficient diameter such that an end of housing 12 can snugly fit into an end of a furnace flue or an outlet air duct 62. If the air duct has a male end 64, a female end of housing 12 is fitted over air duct 62. Alternatively, if the air duct has a female end, a male end of housing may be fitted into the air duct.

For commercial applications, large volumes of air flow must be processed. Known designs cannot cope with such demands. However, the present design can be scaled up to dimensions of 12 inches or more. Moreover, the design does not block the air flow significantly. The diameter of the glass tube 14 is such that the volume of air available to exterior wire mesh 16 is substantially the same as the volume of air available to the interior wire mesh 18. In addition, there is no significant impedance to the flow of air contributed by the glass tube and the wire meshes. The surface area of interior and exterior wire meshes 16, 18 is sufficient to produce enough ozone to oxidize pollutants in the air passing through.

Figure 4:
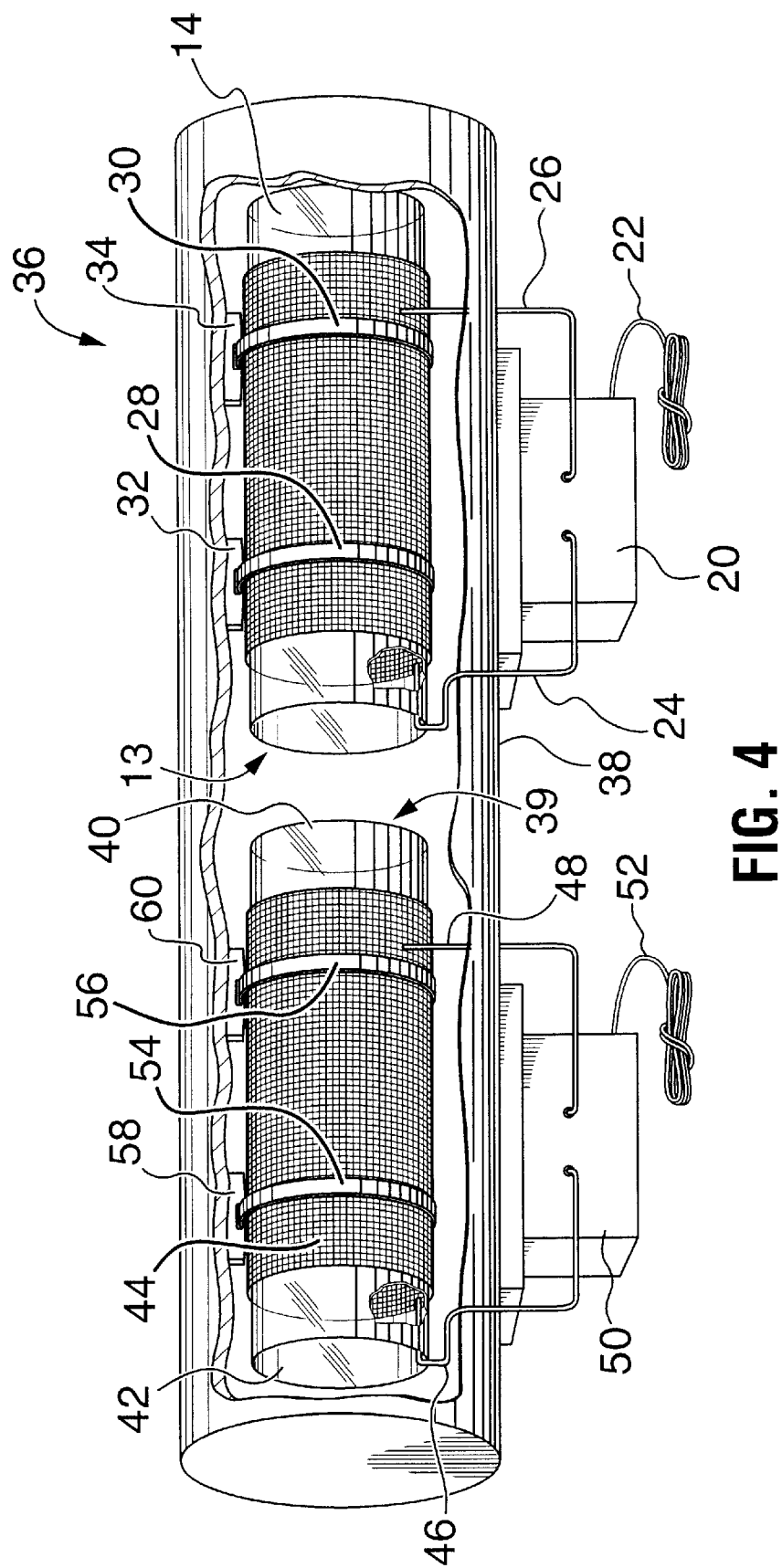

Referring to FIG. 4, an ozone generator 36 has two ozone generating cells 13, 39 present in series in housing 38 to ensure complete oxidation of pollutants in the atmospheric exhaust flowing through housing 38. Thus, not only can the design be scaled up in diameter but any number of cells may be in series in ozone generator 36.

In the event there is no air duct system available or if air flow is inadequate, ozone generator 10 may include a fan 66 (see FIG. 3) or a fan may be provided upstream of ozone generator 10 in an air duct system.

It will be obvious to one skilled in the art that the ozone generator envisioned within the scope of this invention may be implemented to achieve the functionality envisioned herein in various ways.

EXAMPLE 1

| | |
|---|---|
| tube material: | galvanized 20–22 gauge stainless steel (length-15 inches, diameter-6 inches) |
| nylon mounting dielectric tube: | Pyrex (diameter: 3 inches) |
| electrodes (X2): | stainless steel mesh (length: 9.5 inches, diameter- 3 inches) |
| clamps: | trident stainless steel |
| transformer | manufactured by Allanson International Inc. (Model No.: 2227) |
| amperage reading: | 1.60 A |
| volume of housing = | 424 inches$^3$ (volume of air in housing) |
| transformer | manufactured by Allanson International Inc. (Model No.: 2227) |
| amperage reading: | 1.60 A |
| volume of housing = | 424 inches$^3$ (volume of air in housing) |

While the present invention has been described with particularity, it should be understood that various modifications and alterations may be made therein without departing from the spirit and scope of the invention set forth in the appended claims.

What is claimed is:

1. An ozone generator of the corona discharge type comprising:

(a) a housing dimensioned to fit into one of a male end and a female end of an air duct of a building, said housing being at ground potential and electrically isolated from other elements of said ozone generator;

(b) a cylindrical glass tube of a radius substantially less than a width of said housing, said cylindrical glass tube being open at both ends to permit essentially unimpeded air flow through said ozone generator;

(c) an electrically conductive inner mesh fitted over an interior surface and an electrically conductive outer mesh fitted over an exterior surface of said cylindrical glass tube; and (d) means for generating an electric potential difference between said inner and outer meshes, said electric potential difference creating an electric field in a region between said inner and outer meshes and at said interior and exterior surfaces of said cylindrical glass tube, and said electric field being sufficiently large to generate corona discharge.

2. An ozone generator according to claim 1, wherein said housing is a hollow metal tube and said air duct is an exhaust pipe.

3. An ozone generator according to claim 1, wherein the radius of said glass tube is such that a volume of air exposed to the surface of said electrically conductive inner mesh and a volume of air exposed to the surface of said electrically conductive outer mesh are substantially the same.

4. An ozone generator according to claim 1, further comprising a fan mounted in said housing.

5. An ozone generator of the corona discharge type comprising:
   (a) a housing dimensioned to fit into one of a male end and a female end of an air duct of a building, said housing being at ground potential and electrically isolated from other elements of said ozone generator;
   (b) a plurality of ozone generating cells mounted in longitudinal alignment in said housing, each of said ozone generating cells comprising:
      (i) a cylindrical glass tube of a radius substantially less than a width of said housing, said cylindrical glass tube being open at both ends to permit essentially unimpeded air flow through said ozone generator;
      (ii) an electrically conductive inner mesh fitted over an interior surface and an electrically conductive outer mesh fitted over an exterior surface of said cylindrical glass tube; and
      (iii) means for generating an electric potential difference between said inner and outer meshes, said electric potential difference creating an electric field in a region between said inner and outer meshes and at said interior and exterior surfaces of said cylindrical glass tube, and said electric field being sufficiently large to generate corona discharge.

* * * * *